A. F. LANDEFELD.
AUTOMATIC CAMERA LOCKING DEVICE.
APPLICATION FILED APR. 20, 1917.
1,281,175.
Patented Oct. 8, 1918.
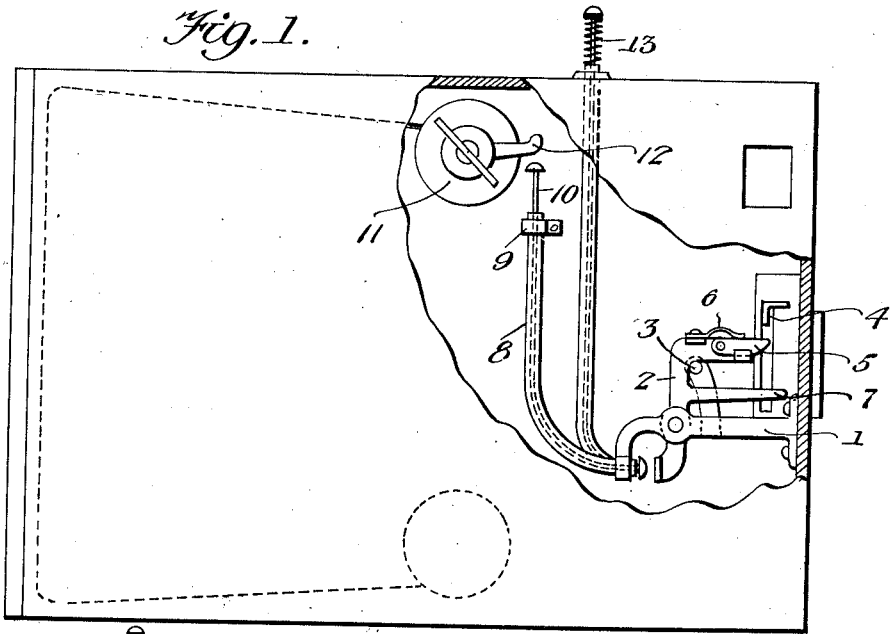
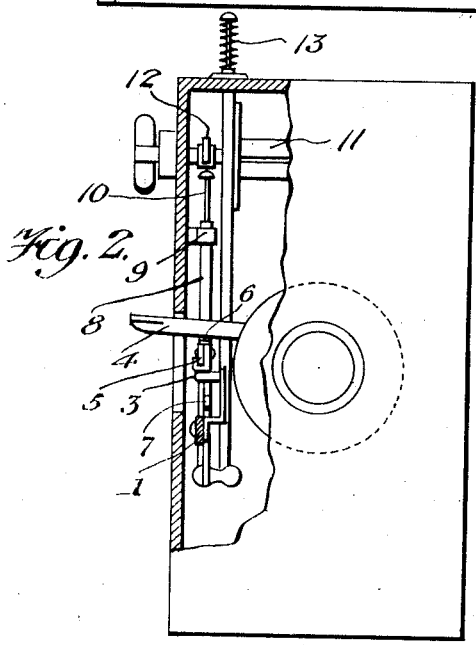
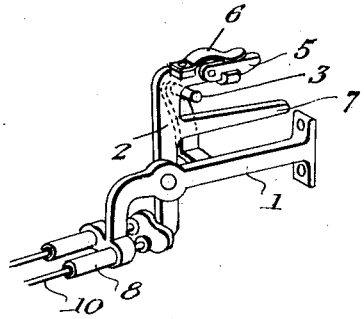
INVENTOR
A. F. Landefeld
BY Victor J. Evans
ATTORNEY

UNITED STATES PATENT OFFICE.

ALEXANDER F. LANDEFELD, OF MANSFIELD, OHIO.

AUTOMATIC CAMERA-LOCKING DEVICE.

1,281,175.　　　　　Specification of Letters Patent.　　Patented Oct. 8, 1918.

Application filed April 20, 1917. Serial No. 163,513.

*To all whom it may concern:*

Be it known that I, ALEXANDER F. LANDEFELD, a citizen of the United States, residing at Mansfield, in the county of Richland and State of Ohio, have invented new and useful Improvements in Automatic Camera-Locking Devices, of which the following is a specification.

This invention relates to automatic camera locking devices and it consists in the novel features hereinafter described and claimed.

The invention applies more particularly to box and folding cameras, or cameras of the type in which film rollers are used. Amateur users of the cameras have experienced considerable loss and disappointment in the use of the camera in consequence of forgetfulness to rotate properly the film roll after one exposure to take a picture, in order to bring another portion of the film into proper position for exposure to take a subsequent picture.

The shutter of the camera is always set and operated by pushing the shutter lever to one side. To make a picture, the shutter lever is pressed to one side to cause the shutter to open and expose the film. When it is desired to take a subsequent picture the winding reel must be turned by the winding key to turn off enough of the film of the film roll for that picture, thereby turning a new film into position for the picture. The foregoing operation is repeated for each picture. The film roll is divided into exposures of suitable and the same size, and is numbered consecutively. In the back of the camera is a little red window, by watching in which, the numerals may be observed as they are brought to view therethrough by the turning of the film reel to bring a new exposure into the proper position to take a picture. By operating the shutter by its lever the shutter is opened and the picture taken, as explained. At some time before taking the next picture, the winding key should be turned to bring a new film into position. But as stated it is sometimes the case that through forgetfulness, the key is not turned and consequently a new film is not brought into position, with the result that the subsequent picture is taken upon the one already taken, or in brief, a double exposure, as it is called, is had, and of course, both pictures ruined. What is even more annoying than the loss of the film, is the loss of the pictures, since it is the case that the fact of double exposure is not known until the development of the pictures. As stated the shutter is operated by a lever by pushing the lever to one side and advantage is taken of this arrangement to provide a locking mechanism which engages the lever and locks it against being pushed from one side until a new film is ready, in proper position for the taking of the picture. Further provision is made for unlocking the shutter lever by the operation of the winding key to bring a new film into position. Thus if the shutter lever be pushed to take a picture, but is found to be locked, a double exposure is prevented, and the operator is reminded that a new film should be brought into position. By turning the winding key the new film is brought into position and the locking mechanism unlocked to permit the shutter lever to be pushed to operate the shutter to take the picture.

In the accompanying drawing:—

Figure 1 is an elevation of the lever locking mechanism;

Fig. 2 is a similar view looking at the same at a right angle to the view shown in Fig. 1;

Fig. 3 is a fragmentary perspective view of the device.

As illustrated in the accompanying drawing, the locking device comprises a bracket 1 which is suitably secured to the wall or side of the shutter box of the camera. A bell crank lever 2 is pivotally mounted upon the bracket 1 and a pin 3 is fixed to the body of the camera and is located in the path of movement of the bell crank lever 2 and adapted to limit the swinging movement of the same in one direction. The shutter operating lever is indicated at 4 and may be of usual pattern and may operate the shutter mechanism in a usual manner; the said shutter mechanism is not shown.

A pawl 5 is pivotally mounted at the upper end of the lever 2 and the free end of the said pawl is normally located under the shutter operating lever 4. A spring 6 is mounted upon the lever 2 and bears at one end against the pawl 5 and serves to hold that portion of the pawl 5 in contact with the body of the lever 2 whereby the said pawl 5 is restrained against movement with relation to the lever 2 in one direction but is free to move in an opposite direction.

The lever 2 is provided at a point between its upper end and its point of pivotal connection with the bracket 1, with a finger 7 which is disposed under the lever 4 and which is spaced from the pawls 5.

A flexible tube 8 of rubber or other suitable material is connected at one end with the bracket 1 and the opposite end of the said tube is supported in a clip 9 or other suitable device attached to the body of the camera. A flexible element 10 is slidably mounted in the tube 8 and the said element may be in the form of a spring wire and one end thereof is located opposite the lower end of the lever 2 as best shown in Fig. 1 of the drawings. The film roller 11 of the camera is of usual pattern and is journaled for rotation in the body of the same. The shaft of the said roller is provided with an arm 12 and one end of the flexible element is located in the path of movement of the said arm 12.

From the foregoing description it is apparent that when the roller 12 is turned to bring a new portion of the film in position for an exposure the arm 12 will engage the adjacent end of the flexible element 10 whereby the said element is moved longitudinally through the tube 8 and the other end of the said element encounters the lower end of the bell crank lever 2 whereby the said lever is swung and the pawl 5 is moved in a backward or counter clockwise direction. Inasmuch as the lever 4 extends above the pawl 5 when the bell crank 2 is swung the pawl 5 moves away from the lever 4 and the finger 7 moves up under the lever 4 and in the path of movement of the same. Consequently when the lever 4 is depressed it strikes the finger 7 and swings the bell crank 2 back into engagement with the pin 3. Thus the bell crank 2 is swung back to its normal position as the lever 4 is depressed to operate the shutter. When the lever 4 is released of the pressure it swings up past the pivotal pawl 5 which swings and distorts the spring 6. There is sufficient friction at the pivot of the bell crank 2 to hold the same during the distortion of the spring 6. When the lever 4 swings up beyond the pawl 5 the spring 6 swings the pawl 5 in a downward direction. In order to again operate the shutter it is necessary to turn the roller 12 which actuates the element 10 and unlocks the trigger and the operation above described is repeated.

When it is desired to manipulate the shutter lever without disturbing the film, flexible element 13 which is similar in structure and arrangement to the element 10 may be depressed whereby the lever 2 is swung, and thus a time exposure may be had.

From the foregoing description taken in conjunction with the accompanying drawing, it will be seen that a camera locking mechanism of simple and durable structure is provided, and that the same is automatic in its action to retain and release the shutter operating lever at such time as the film roller is turned in order to bring a new section or portion of the film in proper position for an exposure through the opening in the shutter.

Having described the invention what is claimed is:—

In combination with a film roller having an arm of a shutter lever, a locking device comprising a finger attached to the film roller, a bracket mounted adjacent the lever, a bell crank lever mounted on the bracket, a spring pressed pawl carried by the bell crank lever and normally positioned below the shutter lever, a pin mounted on the bracket for limiting the swinging movement of the bell crank lever in one direction, a flexible element mounted in a guide and having one end located in the path of movement of the arm and its other end adjacent one end of said bell crank lever, and a finger carried by the bell crank lever and located in the path of movement of the shutter lever, said finger being located at the opposite side of the pin from that side at which the end of the lever which carries the pawl is located.

In testimony whereof I affix my signature.

ALEXANDER F. LANDEFELD.